Jan. 5, 1965 C. VAN DER LELY 3,164,387
IMPLEMENTS FOR SPREADING MATERIAL OVER THE GROUND
Filed July 18, 1961 8 Sheets-Sheet 1

INVENTOR.
CORNELIS VAN DER LELY
BY
Mason, Mason & Albright
ATTORNEYS

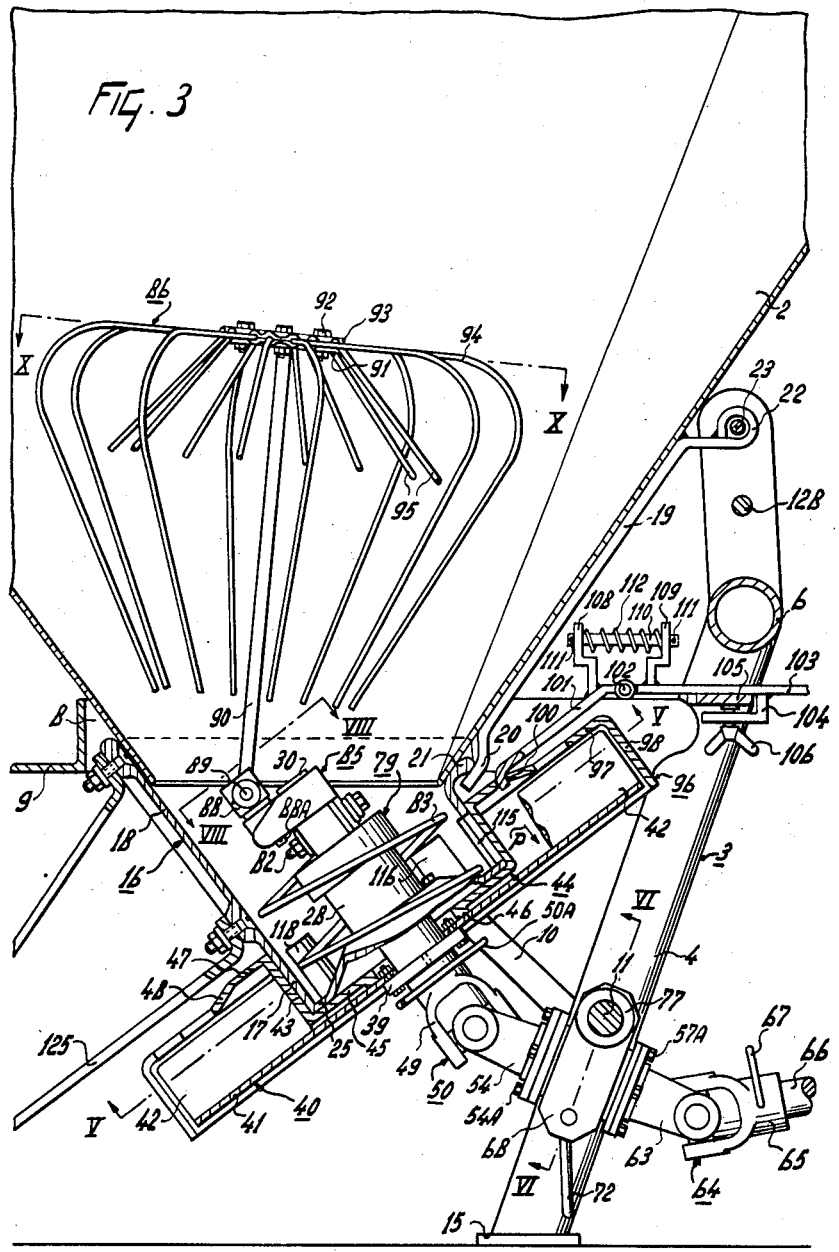

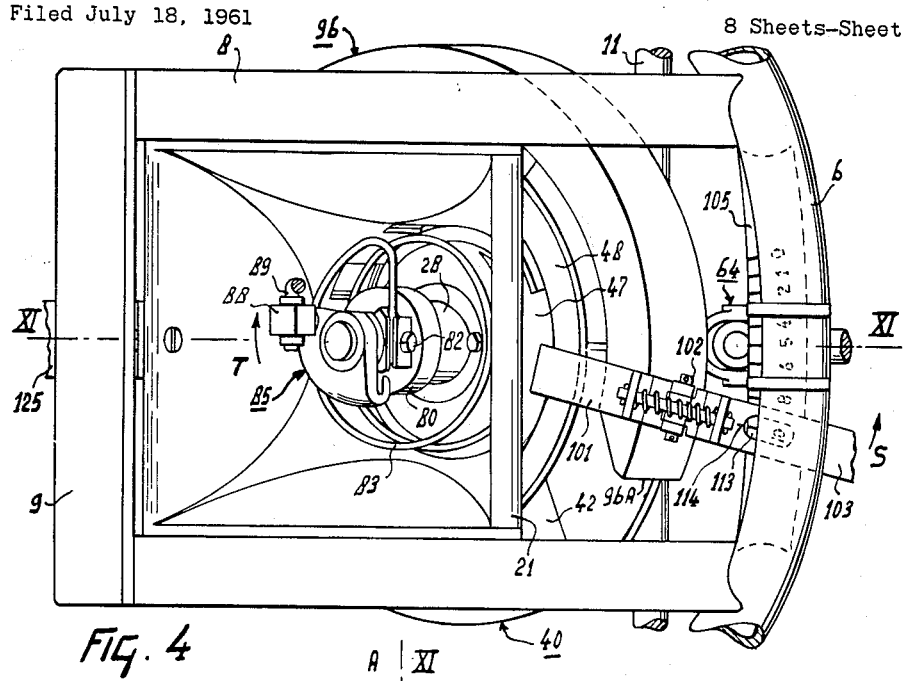

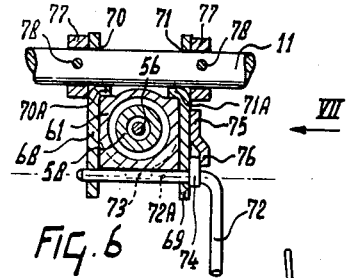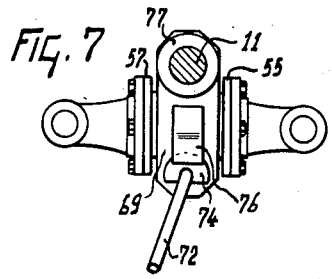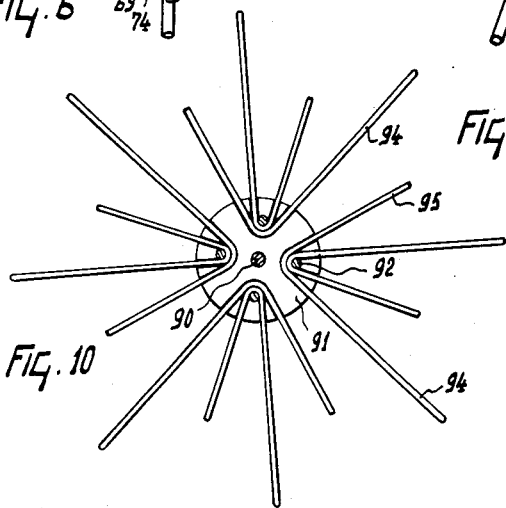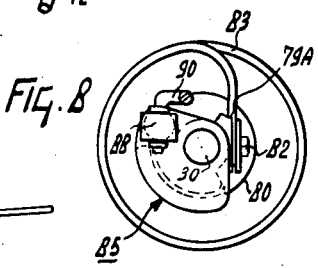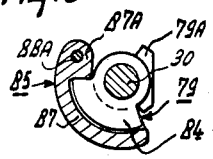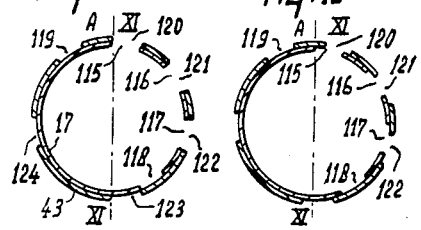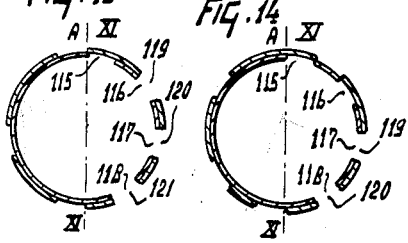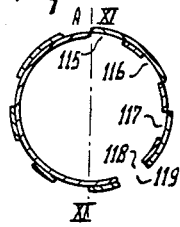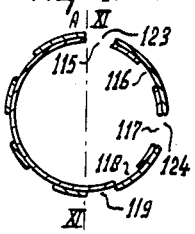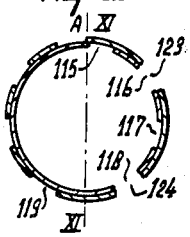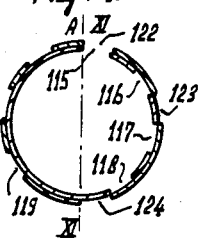

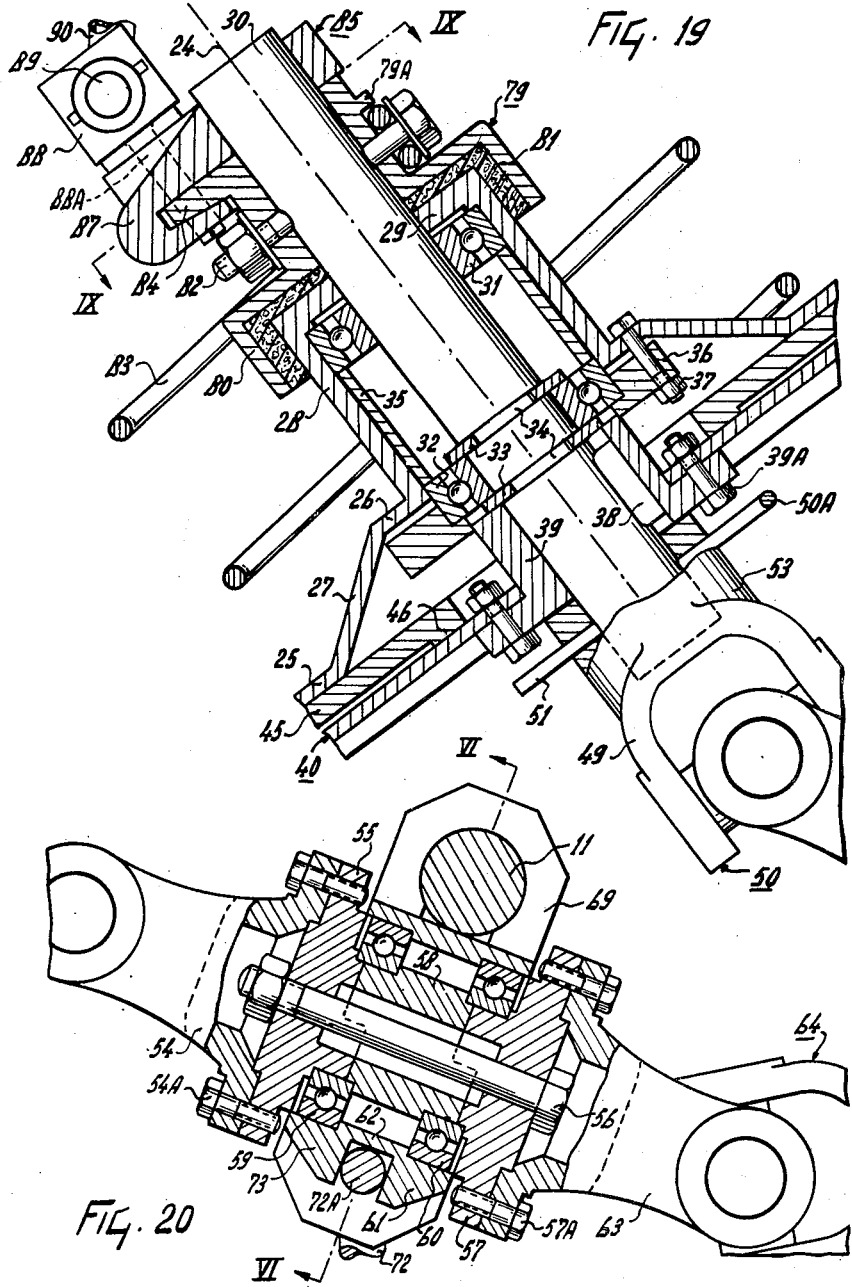

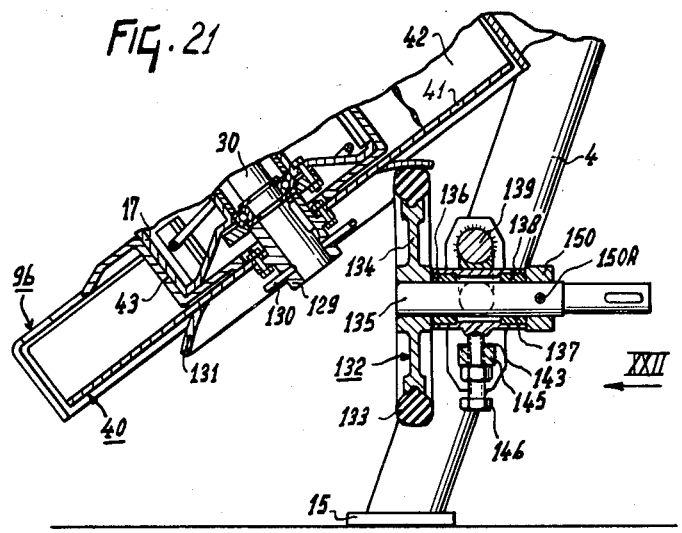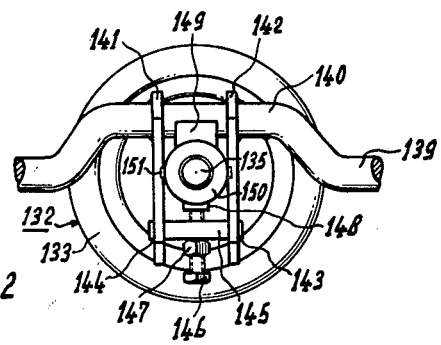

Jan. 5, 1965 C. VAN DER LELY 3,164,387
IMPLEMENTS FOR SPREADING MATERIAL OVER THE GROUND
Filed July 18, 1961 8 Sheets-Sheet 7

INVENTOR.
CORNELIS VAN DER LELY
BY
Mason, Mason & Albright
Attorneys

Jan. 5, 1965             C. VAN DER LELY             3,164,387
IMPLEMENTS FOR SPREADING MATERIAL OVER THE GROUND
Filed July 18, 1961                                8 Sheets-Sheet 8
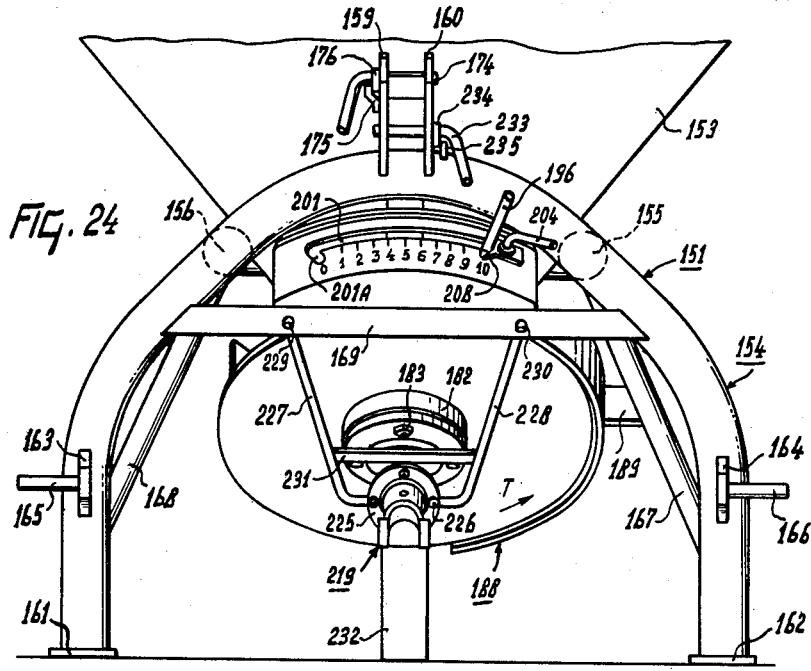
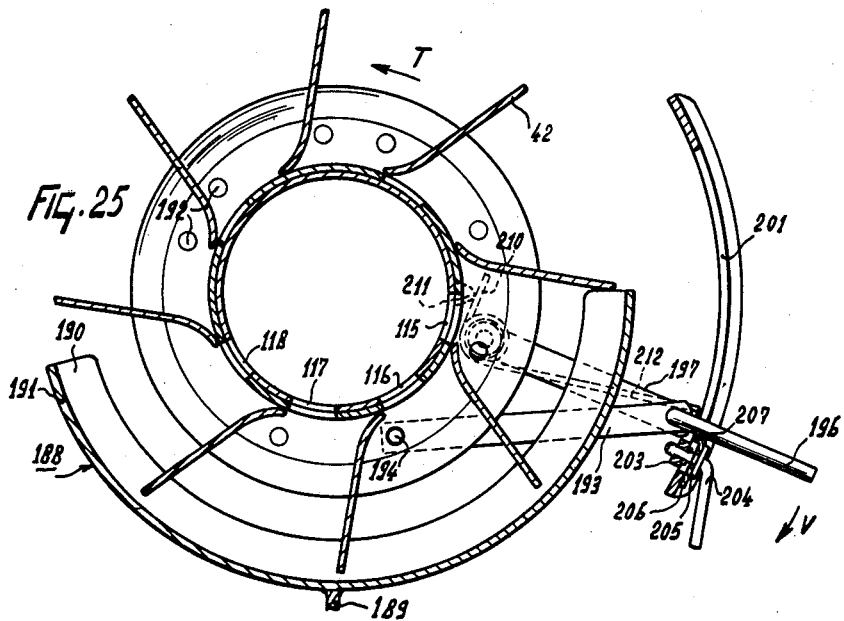
INVENTOR.
CORNELIS VAN DER LELY
BY
Mason, Mason & Albright
Attorneys

United States Patent Office 3,164,387
Patented Jan. 5, 1965

3,164,387
IMPLEMENTS FOR SPREADING MATERIAL
OVER THE GROUND
Cornelis van der Lely, Zug, Switzerland, assignor to Patent Concern N.V., Willemstad, Curacao, Netherlands Antilles, a limited-liability company of the Netherlands Antilles
Filed July 18, 1961, Ser. No. 124,825
Claims priority, application Netherlands July 27, 1960
17 Claims. (Cl. 275—8)

This invention relates to implements for spreading material over the ground, such implements being of the kind comprising a frame movable over the ground, a container for powdered or granular material and a member for spreading the material during operation of the implement.

An object of the invention is to provide an implement in which drive can be transmitted to the movable parts of the implement in a simple manner.

According to the invention there is provided an implement of the kind set forth, wherein the spreading member is mounted so as to be rotatable about an axis which is substantially inclined to the horizontal.

For a better understanding of the invention and to show how the same may be carried into effect reference will now be made, by way of example, to the accompanying drawings, in which:

FIGURE 1 is a side elevation of an implement in accordance with the invention connected to a tractor, FIGURE 2 is a view taken in the direction indicated by the arrow II of FIGURE 1, FIGURE 3 is a section, to an enlarged scale, taken on the line III—III of FIGURE 2, FIGURE 4 is a plan view corresponding to FIGURES 1 and 2 but with certain parts omitted for the sake of clarity, FIGURE 5 is a section taken on the line V—V of FIGURE 3, FIGURE 6 is a section taken on the lines VI—VI of FIGURE 3 and VI—VI of FIGURE 20, FIGURE 7 is a view taken in the direction indicated by the arrow VII of FIGURE 6, FIGURE 8 is a section taken on the line VIII—VIII of FIGURE 3, FIGURE 9 is a section, to a reduced scale, taken on the line IX—IX of FIGURE 19, FIGURE 10 is a section taken on the line X—X of FIGURE 3, FIGURES 11 to 18 show part of the implement in various positions of adjustment, FIGURE 19 shows some of the parts illustrated in FIGURE 3 in greater detail, FIGURE 20 shows further parts illustrated in FIGURE 3 in greater detail, FIGURE 21 is a sectional side elevation showing an alternative embodiment of part of an implement in accordance with the invention, FIGURE 22 is a view taken in the direction indicated by the arrow XXII of FIGURE 21, FIGURE 23 is a sectional side elevation of a further alternative embodiment of an implement in accordance with the invention, FIGURE 24 is a view taken in the direction indicated by the arrow XXIV of FIGURE 23, FIGURE 25 is a section taken on the line XXV—XXV of FIGURE 23, and FIGURE 26 is a broken view showing parts illustrated in FIGURE 23 in greater detail.

Referring to FIGURES 1 to 20 of the drawings, the implement has a frame 1 which supports a container for powdered or granular material, part of which container is in the form of a hopper 2. The frame 1 includes a curved frame beam 3 which consists of two symmetrical upwardly inclined portions 4 and 5 and an integral curved connecting portion 6 (FIGURE 2). The frame beam 3 has the general appearance of an inverted V with a rounded apex. Two parallel frame beams 7 and 8 are secured respectively to the transition point between the portion 4 and the portion 6 and the transition point between the portion 5 and the portion 6, the ends of the beams 7 and 8 remote from the frame beam 3 being connected to one another by a transverse frame beam 9 of right-angled cross-section. The connection between the frame beam 7 and the portion 5 and that between the frame beam 8 and the portion 4 are both reinforced by means of a corresponding inclined strut 10. The portions 4 and 5 of the frame beam 3 are also connected to one another by means of a transverse bar 11 which passes through horizontal holes provided in the portions 4 and 5 respectively. The opposite ends of the bar 11 have portions in the form of pins 12 of reduced diameter. Two vertical plates 13 and 14 are secured to the uppermost part of the curved portion 6 of the frame beam 3, the plates 13 and 14 being spaced a short distance laterally from one another and being provided with a plurality of holes which are in horizontal alignment. Each of the free ends of the two portions 4 and 5 is provided with a corresponding horizontal support plate 15 adapted to make contact with the ground.

A housing 16 forming part of the container is secured to the frame beams 7 and 8 and is adapted to receive the lower end of the hopper 2. The lowermost end 17 of the housing 16 is cylindrical whereas the periphery of its upper portion 18 is rectangular to correspond with the shape of the lowermost edge of the hopper 2 which bears thereagainst. The hopper 2 is hexagonal when seen in plan view and is maintained in position by means of a strip 19 which is welded or otherwise secured to its rearmost side. The lowermost end of the strip 19 is bent to form a lug 20 spaced from the wall of the hopper, the said lug 20 engaging around a bent-over edge 21 of the upper portion 18 of the housing 16 in such a way that the said edge 21 is disposed between the wall of the hopper 2 and the lug 20. The uppermost end of the strip 19 is bent to form a loop 22 through which a pin 23 is entered. The pin 23 is entered also through a pair of the aforementioned horizontally aligned holes formed in the plates 13 and 14. Since the lowermost end of the hopper 2 is open, the powdered or granular material which is to be spread by the implement can pass freely into the housing 16. The center line 24 (FIGURE 19) of the housing 16 is contained in a vertical plane extending substantially parallel to the intended direction of travel and is inclined to the horizontal at an angle of 53° whereas the center line (not shown) of the hopper 2 is disposed substantially vertically.

A larger annular part 25 and a smaller annular part 26 are disposed at the lowermost end of the housing 16, the said annular parts being interconnected by means of an integral conical portion 27. A cylindrical sleeve 28 whose axis coincides with the center line 24 of the housing 16 is integral with the smaller annular part 26. The end of the sleeve 28 remote from the part 26 is integral with an annular plate 29 having a hole whose center also coincides with the line 24. The parts 25 to 29 are all integral with one another and with the housing 16.

A shaft 30 is journalled in the sleeve 28 by means of spaced roller bearings 31 and 32, the bearing 31 abutting against the plate 29. The spacing between the bearings 31 and 32 is maintained by means of a sleeve 35 while the position of the bearing 32 axially of the shaft 30 is maintained by means of two washers 33 of resilient material which are arranged on opposite sides of the said bearing in annular grooves 34 formed in the surface of the shaft. The bearings 31 and 32 are substantially completely enclosed within the sleeve 28 by means of a cover 36 which is secured to the smaller annular part 26 by means of bolts 37.

The shaft 30 is immovable axially relative to the housing 16 since the bearing 32 is fixed in position relative to the housing 16 and the shaft 30 is fixed in position relative to the bearing 32. A hub 39 is secured to the shaft 30 below the cover 36 by means of a key 38 and, in turn, a spreading member is secured to the hub 39 by means of bolts 39A. A spreading member 40 is disposed beneath the bottom of the housing 16 and includes a circular plate 41 extending perpendicular to the line 24 and also six blades 42, the greater part of each of which extends radially of the said line 24.

The cylindrical lower part 17 of the housing 16 is surrounded by a cylindrical part 43 of an ejection control member generally indicated by the reference numeral 44. An annulus 45 disposed between the plate 41 and the aforementioned larger annular part 25 is integral with the cylindrical part 43 and has a shoulder 46 with which it bears against the said plate 41. The cylindrical part 43 is integral with a further annulus 47 which lies in a plane parallel to that containing the plate 41 and which has a rim 48 bevelled in such a way that it is inclined towards the plate 41.

The lowermost end of the shaft 30 which projects below the spreading member 40 has a part 49 of a universal joint 50 secured thereto. The part 49 has a hub 53 which is received over the end of the shaft 30 and is secured thereto by a U-shaped pin 50A one of whose limbs 51 passes through aligned bores in the hub 53 and shaft 30. The other limb of the pin 50A includes a curved portion which engages the cylindrical outer surface of the hub 53 in such a way that the pin 50A is prevented from becoming accidentally dislodged. The universal joint 50 is completed by a second part 54 which is secured to a plate 55 (FIGURE 20) by means of bolts 54A. The plate 55 is secured to a similar plate 57 by means of a bolt 56 and an intermediate piece 58. The plates 55 and 57 and also the intermediate piece 58 are provided with matching projections and recesses so that the plates 55 and 57 cannot turn relative to one another about the axis of the bolt 56. Two bearings 59 and 60 have their inner races received in recesses provided in the plates 55 and 57 and in the intermediate piece 58, the outer races of the bearings being lodged in recesses formed on either side of a shoulder 62 provided on a block 61.

A part 63 of a further universal joint 64 is secured to the plate 57 by means of bolt 57A, the co-operating part 65 of the further universal joint 64 being secured to a driving shaft 66 (FIGURE 3) by means of a pin 67 similar to the pin 50A previously described. As can be seen in FIGURES 6 and 7, the intermediate part 58 is sandwiched between two plates 68 and 69 which are provided with holes 70 and 71 respectively. The aforementioned bar 11 is entered through both these holes in such a way that the plates 68 and 69 are turnable about the axis of the bar 11. The block 61 is also disposed between the plates 68 and 69 and is held in position by means of bent-over portions 70A and 71A of the plates 68 and 69 respectively and also by means of a locking pin 72 located beneath the block and entered through aligned holes in the plates 68 and 69. The holes just mentioned are arranged in positions which are such that the pin 72 passes between two spaced lugs 73 projecting from the block 61. The locking pin 72 is retained in position with the aid of an eccentrically mounted disc 74 which is secured to the pin 72 and which lies between the plate 69 and a portion 76 of a further plate 75 which is secured to the plate 69. The plate 75 is bent in such a way that the portion 76 thereof is spaced from the side of the plate 69 by a distance which is approximately equal to the thickness of the disc 74.

In the position of the locking pin 72 shown in FIGURES 6 and 7, the pin cannot move axially of its center line 72A (FIGURE 6) due to the engagement of the disc 74 between the plate 69 and the portion 76 whereas, after turning the pin 72 through approximately 180° about the line 72A, the eccentric disc 74 is moved out of register with the portion 76 so that the pin 72 can be moved axially of the line 72A. The block 61 can then be taken out from between the plates 68 and 69.

It will be clear from the drawings that, when the block 61 is arranged between the plates 68 and 69, these plates cannot be moved towards one another. Moreover, the plates cannot be moved further away from one another because such movement is blocked by a pair of rings 77 disposed around the bar 11 and secured thereto by transverse pins 78. The plates 55 and 57, together with the intermediate piece 58, constitute a rotatable member by means of which the spreading member 40 is coupled to the driving shaft 66, this member being displaceable about the longitudinal axis of the bar 11 which axis extends perpendicular to that of the bolt 56 by which the parts 55, 57 and 58 are secured to one another.

A coupling member 79 is secured to the upper end of the shaft 30 by means of a bolt 82 which passes through aligned holes in the coupling member and shaft, the coupling member 79 including a dished portion 80 which surrounds the upper end of the sleeve 28. A packing 81 is provided in the space between the interior of the dished portion 80 and the exterior of the sleeve 28. The bolt 82 also acts to secure one end of a helical compression spring 83 to the coupling member 79 (see FIGURES 4 and 19). The diameter of the spring 83 is smaller than the internal diameter of the cylindrical lower part 17 of the housing 16 and its free end is disposed just clear of the larger annular part 25. The spring 83 is prevented from turning about the axis of the bolt 82 by virtue of the fact that the loop by which it engages the said bolt is held between a radial part of the dished portion 80 and a ridge 79A integral with the coupling member 79.

A lug 84 projects from the coupling member 79 on the side thereof opposite to the ridge 79A and acts as an anchorage for the fastening member 85 of an agitator 86.

The fastening member 85 is provided with a central hole through which the shaft 30 is entered and has a part 87 which is adapted to grip the lug 84. Rotation of the fastening member 85 about the shaft 30 is limited in one direction by means of a lug 87A (FIGURE 9) which is integral with the fastening member 85 and which acts as a stop for the lug 84. It can be seen from FIGURE 9 that relative rotation between the lug 84 and the coupling member 85 will bring the lug 84 out of abutting engagement with the lug 87A and also out of register with the part 87. The fastening member 85 can then be withdrawn axially of the shaft 30.

A bearing 88 is turnable about the axis of a shaft 88A which is rotatably journalled in the fastening member 85, the axis of the shaft 88A extending parallel to the center line 24. The bent-over end 89 (see FIGURES 3, 4 and 19) of a rod 90 forming part of the agitator 86 is rotatably journalled in the bearing 88. The rod 90 is arranged to extend substantially vertically within the hopper 2. The end 89 of the rod 90 intersects the axis of the shaft 88A at right angles. The uppermost end of the rod 90 is rigidly secured to the center of a circular plate 91 (see FIGURES 3 and 10) which lies in a plane perpendicular to the axis of the rod 90. A circular plate 93 is fastened to the plate 91 by means of bolts 92 and a number of rods 94 and 95 are clamped rigidly between the plates. Each rod 94 has a portion which extends radially of the rod 90, a curved portion and a straight portion which extends downwardly towards the lowermost end of the rod 90. Each rod 95 is inclined downwardly from the point where it projects beyond the margins of the plates 91 and 93. As can be seen in FIGURE 10, each rod 94 is integral with a corresponding rod 95 and the number of bolts 92 is equal to one quarter of the total number of rods 94 and 95. The rods are preferably made from spring steel and the recesses between the plates 91 and 93 which house the rods may be so shaped that the portions of the rods which project beyond the plates are turnable about the axis of the portions within the recesses. The torsional deformation of the portions within the recesses resists such movements. In the embodiments illustrated, the rods 95 lie wholly within the figure which would be generated by the rods 94 upon rotation of the rod 90 about its own axis.

As can be seen in FIGURES 3 to 5, the spreading member 40 is partially surrounded by a screening rim 96 which is connected to the frame 1 of the implement. The screening rim 96 has a portion 97 which lies in a plane parallel to the plane containing the plate 41 and also a cylindrically curved portion 98 whose center of curvature is afforded by the line 24. The inner edge of the portion 97 subtends an angle of approximately 180° at the line 24 whereas the radially outermost edge subtends an angle of approximately 205°, the opposite ends of the said portion 97 being bevelled. The portion 98 extends below the edge of the plates 41 (see FIGURE 3) and also subtends at an angle of about 205° at the line 24. The precise position of the screening rim 96 can be appreciated more clearly by referring to the lines XI—XI in both FIGURES 4 and 5, this line occupying the same position in both figures. The location indicated by the letter A in FIGURE 5 indicates the front side of the implement, that is to say, the side at which the curved frame beam 3 is arranged.

The annular part 47 of the control member 44 is formed with a plurality of slotted holes 99 (FIGURE 5). The bent-over end 100 (FIGURE 3) of an arm 101 can be inserted into a chosen one of the holes 99. The arm 101 is turnable about a horizontal pivot 102 and a further arm 103 is also turnable about this pivot. A bracket 104 is secured to the said further arm 103 and carries a clamp 106 with the aid of which the arm 103 can be retained in any desired angular setting relative to a curved plate 105 secured to the frame beam 3. Upon releasing the clamp 106, the control member 44 can be turned about the center line 24 of the housing 16 with the aid of the arm 103. In order to prevent the bent-over end 100 from becoming disengaged from the previously chosen hole 99, the arm 101 carries a projecting lever 108 and the arm 103 carries a similar lever 109, the two levers being formed near their free ends with holes through which a rod 110, of less diameter than the said holes, is passed. The rod 110 is retained in engagement with the levers 108 and 109 by means of pins 111 disposed in transverse bores in the opposite ends thereof. A helical compression spring 112 surrounds the rod 110 and bears between the facing sides of the levers 108 and 109, this spring tending to turn the arm 101 in the direction indicated by the arrow P in FIGURE 3. This, of course, maintains the bent-over end 100 in engagement with the chosen hole 99. The arm 101 can readily be turned manually against the pressure of the spring 112 in a direction opposite to the direction P to release the bent-over end 100 from the hole 99 when this is required.

The arm 103 is formed with a slot 113 (FIGURE 4) through which slot the upper side of the curved plate 105 can be seen. A scale is inscribed on the plate 105 and the arm 103 has a mark 114 which can be brought into alignment with any desired value on the said scale. Each value corresponds to a predetermined fine setting of the control member 44, each such setting affording a different rate of flow of the powdered or granular material which is to be spread as will hereinafter be described.

The control member 44 together with the arms 101 and 103 are shown occupying a different position in FIGURE 3 from that which they occupy in FIGURES 4 and 5.

Four outlet ports 115, 116, 117 and 118 are formed in the cylindrical lower part 17 of the housing 16 whereas the cylindrical parts 43 of the control member 44 which surrounds the part 17 is formed with six outlet ports 119 to 124. Fine adjustment of the control member 44 by means of the arm 103 brings one or more of the ports 119 to 124 into full or partial alignment with one or more of the ports 115 to 118 so that powdered or granular material from the hopper 2 can reach the bladed spreading member 40. Each edge of each port 115 to 118 is spaced over approximately 45° from the corresponding edge of the neighboring port, the wall sections between the ports being approximately the same size as the ports themselves so that each port subtends an angle of approximately 22½° at the center line 24.

The ports 119 to 122 are spaced in a similar manner to the ports 115 to 118 but the port 123 is spaced at an angle of about 67° from the port 122 and the port 124, which lies between the port 119 and the port 123, is spaced through an angle of approximately 90° from the port 123. The various adjustments of the control member 44 which can be effected will hereinafter be described in greater detail with reference to FIGURE 5 and FIGURES 11 to 18. In order to assist in the understanding of the latter figures the line XI—XI and the location A which appear in FIGURE 5 are indicated upon each of them.

When the implement is not in operation, it may be supported on the ground by means of the two plates 15 and by means on a support 125 secured to the housing 16 on the opposite side thereof to the plate 115. When the implement is to be used, it is coupled with the three point lifting device of a tractor or like vehicle to enable it to be lifted clear of the ground. With reference to FIGURE 1, the lowermost lifting links 126 of a three point lifting device are connected to the pins 12 which project from either end of the bar 11 whereas the upper adjustable lifting link 127 of the device is coupled to the plates 13 and 14 by means of a transverse pin 128 lodged in two of the holes formed in said plates. The spreading member 40 and agitator 86 are coupled by means of the universal joints 50 and 64 to the driving shaft 66 which is preferably of telescopic construction. The driving shaft 66 is itself coupled to the power take-off shaft of the tractor or like vehicle by means, for example, of a further universal joint or the like. In operation, the shaft 30 is rotated in the direction indicated by the arrow T in FIGURES 2 and 4 of the drawings and the lug 84 of the coupling member 79 is urged into abutment with the lug 87A of the fastening member 85 so that the said fastening member, together with the agitator 86, is rotated with the shaft 30. Owing to the eccentric position of the bent-over end 89 of the rod 90 of the agitator 86 relative to the center line 24 and owing to the oblique inclination of the shaft 30 to the horizontal, the agitator 86 will be moved in both horizontal and vertical directions. The material to be spread is thus prevented from caking in the hopper 2 and a regular flow thereof towards the housing 16 is ensured. Caking of the material is prevented in the housing 16 by the helical spring 83 which is turned by the shaft 30 in a direction such that it urges the material towards the lowermost end of the housing. In any case, the conical shape of the portion 27 of the bottom of the housing acts to direct the material towards the wall of the housing in which the ports 115 to 118 are provided.

Material which has passed through one or more of the ports 115 to 118 and one or more of the ports 119 to 124 arrives on the rotating spreading member 40 which then ejects the said material. The direction in which the material is ejected relative to the implement is determined in part by the setting of the screening rim 96. The rate of flow of material depends, on the other hand, on the total area of the ports which is open, this being decided by suitable fine adjustment of the control member 44 by means of the arm 103. Upon turning the arm 103 in the direction indicated by the arrow S (FIGURE 4) the ports 115 to 118 are progressively closed. That is to say, when the mark is opposite the digit "10" the ports are fully open whereas, when it is opposite the digit "0" they are fully closed.

As previously stated, the greater part of each blade 42 extends radially with respect to the line 24, but, as can be seen in FIGURE 5, the radially innermost end of each blade is bent forwardly in the intended direction of rotation T of the spreading member 40. When the control member 44 is disposed as shown in FIGURES 4 and 5, the ports 115 to 118 are all fully open since each port is in register with a corresponding one of the ports 119 to 112. However, the material can only leave the spreading member 40 in the area in which the screening rim 96 is absent.

It will be apparent that material leaving the housing 16 through the port 115 will take a certain time to pass along the blades 42 to their radially outermost ends so that, in fact, such material will not arrive at the end of the blades until after the blades have passed beyond the end 96A (FIGURE 5) of the screening rim 96. On the other hand, the material leaving the port 118 in a similar manner will, in general, be at or close to the ends of the blades 42 by the time they reach the point 96A so that this material will be ejected from the implement immediately as the blades pass that point. Material leaving the ports 116 and 117 will be ejected from the spreading member 40 at locations intermediate those just mentioned in connection with the ports 115 and 118. The distribution spectrum of the material, that is to say, the area of land over which the material is spread and the disposition of this area relative to the implement, can be varied by suitable coarse adjustment of the control member 44. In addition, the density of spreading of the material can be finely adjusted by opening one or more ports to a greater or lesser extent.

FIGURE 11 shows a setting in which material can pass through only the ports 115, 116 and 117, the port 118 being completely closed. Thus, a smaller quantity of material per unit time can leave the housing 16 than in the arrangement shown in FIGURE 5.

FIGURE 12 illustrates the same arrangement as that shown in FIGURE 11 except that, in this case, the control member 44 has been turned through a very small angle so that the three ports 115 to 117 are partly closed.

In the arrangement shown in FIGURE 13, the port 115 is completely closed whereas the ports 116, 117 and 118 are all fully open. In this arrangement, the same amount of material per unit time will leave the housing 16 as in the arrangement shown in FIGURE 11, but, considered in the direction of rotation T of the spreading member 40, the open ports are considerably further spaced from the point 96A. The effect of this is that the material will fall on a strip of land which is displaced somewhat to the right with respect to the direction of travel of the implement as compared with the corresponding strip when the control member 44 is arranged as shown in FIGURE 11. The width of the strip of land upon which the material falls is approximately the same in both cases.

FIGURE 14 shows a setting of the control member 44 in which the ports 117 and 118 are fully open whereas the ports 115 and 116 are fully closed. The material is distributed over a narrower strip of land than in any of the settings shown in FIGURES 11–13. The strip occupies the same disposition relative to the implement as in the setting of FIGURE 13 but, in this case, the left hand side (considered in the direction of travel of the implement) of the strip corresponding to the setting of FIGURE 13 remains free of material.

FIGURE 15 shows a setting in which only the port 118 is open. It will be clear that in this setting only a narrow strip of ground is fed with material, this strip being located to the right of the implement considered in the direction of travel.

FIGURE 16 shows a setting in which only the port 115 is open. Once again, the material is spread over only a narrow strip of land but, in this instance, the strip is located to the left side of the implement with respect to the direction of travel thereof.

Figure 1:
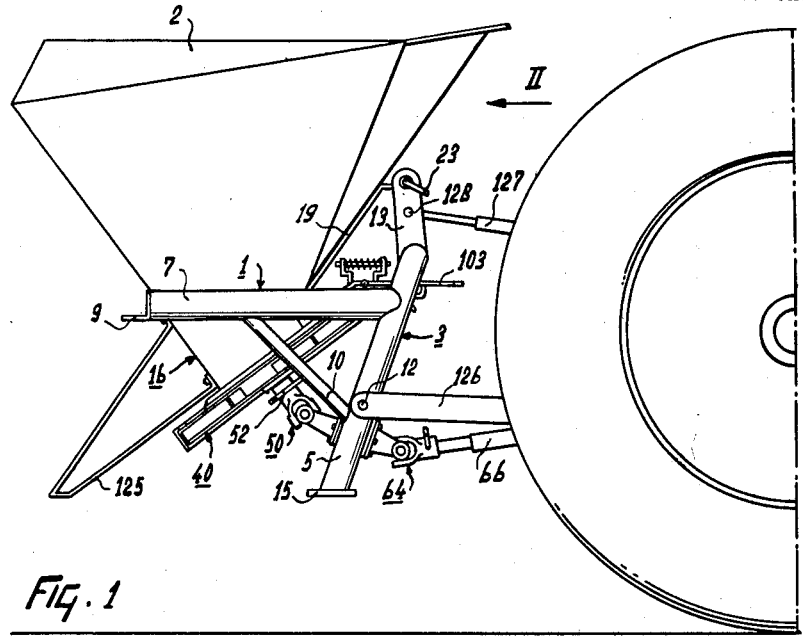

FIGURE 17 shows a setting in which the ports 115 and 117 are completely open whereas the ports 116 and 118 are completely closed. With this arrangement, the material is, in general, spread over two separate narrow strips of land extending in the direction of travel of the implement, the said two strips being separated by a further narrow strip which does not receive any substantial amount of material.

FIGURE 18 shows an arrangement similar to FIGURE 17 except that, in this case, the ports 116 and 118 are open whereas the ports 115 and 117 are closed. Once again, the material will be, in general, spread over two narrow strips which are separated from one another by a further narrow strip which does not receive material, the strips being displaced to the right, considered in the direction of travel of the implement, in comparison with the position of the strip when the control member is arranged as shown in FIGURE 17.

It will be understood that, as shown in FIGURES 11 and 12, the rate of flow of the material through the ports can be adjusted in each of the settings shown in FIGURES 13 to 18 by turning the control member to a greater or lesser extent in the direction indicated by the arrow S in FIGURE 4. This amounts, in effect, to a fine adjustment of the control member 44 whereas the coarse adjustment which is necessary to bring the member from any one of the eight positions shown in FIGURES 5, 11 or 13 to 18 to another one of these positions is effected by engaging the bent-over end 100 of the arm 101 in a corresponding one of the eight holes 99 formed in the annular part 47 of the control member.

The implement is constructed in such a way that it can be readily dismantled. Upon removing the locking pin 72 and the pin 50A the block 61 can be withdrawn from between the plates 68 and 69 and the universal joint 50 can be removed from the end of the shaft 30. The spreading member 40 which is enclosed between the part 49 of the universal joint 50 and one of the resilient washers 33 on the shaft 30 can then be slid axially off the said shaft. The removal of the spreading member 40 makes it possible to remove the control member 44 also.

The agitator 86 is uncoupled from the shaft 30 by turning the fastening member 85 in a direction opposite to that indicated by the arrow T so that the part 87 moves out of register with the lug 84. The agitator 86, together with the fastening member 85, can then be slipped off the upper end of the shaft 30. Upon removing the pin 23 from the plates 13 and 14, the hopper 2 can be lifted off the housing 16. The simple construction of the implement is due, principally, to the oblique position of the spreading member. This allows the said spreading member to be driven by a simple transmission mechanism. It will be clear that the universal joints 50 and 64 may be replaced by other members such as ball and socket joints or flexible shafts.

FIGURES 21 and 22 show parts of an implement which is generally similar to that previously described but in which the moving parts are driven in a different manner. Those parts of the implement which are the same as, or very similar to, those previously described are designated by the same reference numerals as appear in the preceding figures. The hub 39 has an extension 129 and is secured against axial displacement relative to the shaft 30 by means of a pin 130 entered through aligned transversed bores in the shaft 30 and in the said extension 129. The plate 41 of the spreading member 40 is provided with a dished rim 131 which co-operates with a friction wheel generally indicated by the reference numeral 132. The dished rim 131 has a frusto-conical profile whose axis coincides with that of the shaft 30. The apex of the cone is spaced from the intersection of the axes of rotation of the shaft 30 and friction wheel 132 by a distance approximately equal to the radius of the friction wheel. The friction wheel 132 has a rubber periphery 133 which is supported by a wheel disc 134. The wheel disc 134 is rigidly secured to one end of a horizontal shaft 135, to which the shaft 30 is inclined at an angle of less than 90°. The shaft 135 is journalled in two sleeve bearings 136 and 137, the bearings being disposed at opposite ends of a supporting sleeve 138.

In the embodiment illustrated, the straight portions 4 and 5 of the curved frame beam 3 are connected to one another by means of a rod 139 instead of the bar 11 previously described. The rod 139 has a cranked portion 140 to which the plates 141 and 142 are rigidly secured, these plates being located on relatively opposite sides of the supporting sleeve 138. The plates 141 and 142 are provided with slotted holes 143 and 144 respectively, a plate 145 being entered through these holes. The plate 145 is formed with a screw-threaded hole which receives the shank of a bolt 146, the said shank also carrying a lock nut 147 which is screwed against the plate 145 to prevent movement of the bolt 146. The sleeve 138 is provided with a lug 148 having a recess which receives the end of the shank of the bolt 146. Between the sleeve 138 and the cranked portion 140 of the rod 139 a block 149 is arranged, the said block at least partly surrounding the cranked portion 140. The shaft 135 is prevented from axial displacement in the bearings 136 and 137 in one direction by abutment of the wheel disc 134 against one end of the sleeve 138 and in the opposite direction by the provision of a ring 150 which abuts against the opposite end of the sleeve 138. The ring 150 is rigidly secured to the shaft 135 by means of a pin 158 entered in aligned transverse bores formed in the said ring and in the shaft 135. The end of the shaft 135 remote from the friction wheel 132 is adapted for connection to the power take off shaft of a tractor or the like with the aid of, for example, a telescopic coupling shaft.

Figure 23:
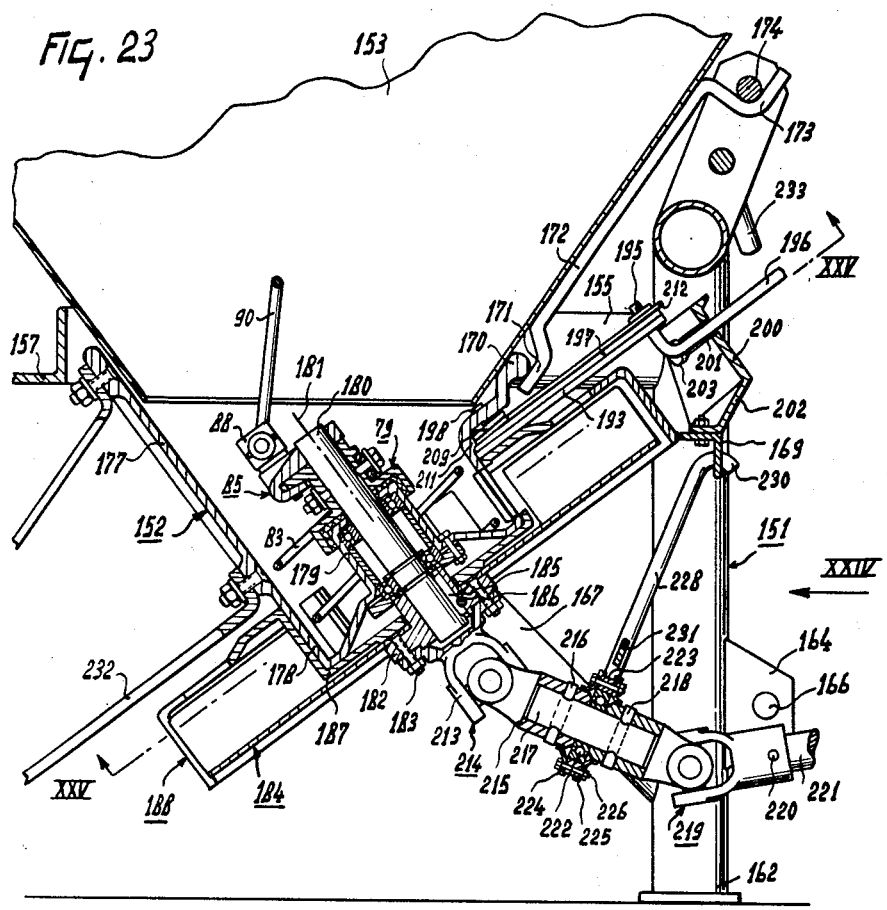
Figure 26:
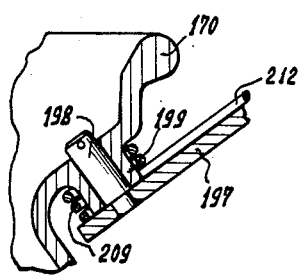

FIGURES 23 to 26 illustrate an implement comprising a frame 151 to which a housing 152 is secured. The lower end of a hopper 153 fits into the upper end of the housing 152. The frame 151 includes a frame beam 154 which has the shape of an inverted U and which lies in a substantially vertical plane. Two parallel frame beams 155 and 156, corresponding to the frame beams 7 and 8 previously described, are secured to the frame beam 154. The ends of the frame beams 155 and 156 remote from the frame beam 154 are connected to each other by a transverse frame beam 157 of right-angled cross-section. The frame beam 154 has two plates 159 and 160 extending parallel to one another and spaced laterally by a short distance. A plurality of horizontally aligned pairs of holes are formed in the two plates 159 and 160. Support plates 161 and 162 adapted to bear against the ground are secured to the two free ends of the frame beam 154. Two brackets 163 and 164 are secured to the rear side of the frame beam 154 at locations a short distance above the plates 161 and 162 respectively, the said brackets carrying aligned horizontal pins 165 and 166 respectively. The connection between the frame beam 154 and the frame beam 155 is reinforced by an inclined strut 167 extending between these beams and the connection between the frame beam 154 and the frame beam 156 is reinforced in a similar manner by a strut 168. The two limbs of the frame beam 154 are interconnected by a horizontal frame beam 169 of right-angled cross-section to which further parts, which will hereinafter be described, are connected.

The housing 152 has a bent-over rim 170 which is gripped by one end 171 of a strip 172 secured to the rear wall of the hopper 153. The upper end 173 of the strip 172 is engaged around a locking pin 174 which is entered through one pair of the holes formed in the plates 159 and 160. The locking pin 174 is retained in position by means of a bracket 175 which is secured to the plate 159 and which is in engagement with an eccentric disc 176 secured to the pin 174. The arrangement of these parts is generally the same as that shown in FIGURES 6 and 7 in respect of the parts 72, 74, 75 and 76.

The housing 152 has an upper rectangular portion 177 and a lower portion 178 of circular cross section, the shape of the housing 152 being substantially the same as that of the housing 16 previously described.

The housing 152 includes a central sleeve 179 in which a shaft 180 is journalled in the same manner as that previously described with reference to the shaft 30, the centre line 181 of the shaft 180 being inclined at an angle of 53° to the horizontal. A hub 182 is secured to the lowermost end of the shaft 180 outside the housing 152 by means of a key 185 and a pin 186 arranged to prevent axial and rotational displacement respectively. The pin 186 is entered through a hole formed in the hub 182, this hole opening also into a groove in one end of the key 185. The pin 186 may, for example, be a spring loaded locking pin which is displaceable against the action of the spring to a position in which it is no longer in register with the groove in the key 185. The hub 182 can then be slid axially off the shaft 180. As an alternative, the pin 186 may, if desired, be entered through a bore formed in the shaft 180 itself.

The cylindrical lower part 178 of the housing 152 is surrounded by a control member 187 which is formed in a similar manner to the control member 44 previously described. A spreading member 184 is partly surrounded by a screening rim 188 which is secured to the strut 167 by means of a strip 189 (FIGURES 24 and 25). The screening rim 188 again comprises a curved portion 190 extending in a single plane at right angles to the line 181 and a cylindrically curved portion 191 whose center of curvature is afforded by the said line 181. The screening rim 188 subtends an angle of approximately 165° at the line 181. The control member 187 is provided with eight holes 192 into any one of which a pin 194 projecting from one end of an arm 193 can be entered. The opposite end of the arm 193 is formed with a hole through which the bent-over end 195 of a pin 196 is taken. The end 195 of the pin 196 is also secured to one end of a further arm 197 whose other end is fixed to a pin 198 turnable in a bearing 199 mounted on the rim 170 of the housing 152. The pin 196 is movable in an elongated arcuate slot 201 formed in a plate 200. The plate 200 is fixed to the frame beam 169 with the aid of a plate 202. A notch 201A (FIGURE 24) is provided at one end of the slot 201, the said notch being inclined to the length of the slot. A block 203 having a screw-threaded hole is disposed on one side of the plate 200, the screw-threaded end of a pin 204 being entered in the said hole. A ring 205 is secured to the pin 204 and a loosely mounted plate 206 (FIGURE 25) is located between the ring 205 and the plate 200. The plate 206 has a bent-over lug 207 which is located transversely within the slot 201 and also a pointer 208 adapted to co-operate with a scale marked in the plate 200 immediately beneath the slot 201.

Since the block 203 and the plate 206 are located on opposite sides of the plate 200, the position of the plate 206 can be secured by tightening the pin 204. The lug 207 prevents the plate 206 from turning about the axis of the pin 204. The plate 206 constitutes a stop for preventing movements of the pin 196 beyond a predetermined limit in the slot 201. The bearing 199 in which the pin 198 is journalled is surrounded by a helical compression spring 209 (FIGURE 26), one end of the said spring being prolonged to form a rod 210 (FIGURE 25) which bears against a lug 211 projecting from the housing 152. The other end of the spring 209 is prolonged to form a rod 212 whose free end bears against the bent-over end 195 of the pin 196. The arrangement is such that the spring 209 tends to move the pin 196 along the slot 201 in the direction indicated by the arrow V in FIGURE 25.

A part 213 of a universal joint 214 is secured to the hub 182 by the bolts 183, the other part 215 of the universal joint being secured to a shaft 217 by means of a transverse pin 216. A second universal joint 219 is secured to the opposite end of the shaft 207 by means of a transverse pin 218, the universal joint 219 being connected to a driving shaft 221 by means of a further transverse pin 220. Between the universal joints 214 and 219 a roller bearing 222 is secured to the shaft 217 by means of a ring 223 of greater diameter than the said bearing 222. The bearing 222 and the ring 223 are held in their appointed positions by means of two symmetrical profiled rings 224 and 225 which are clamped to one another about the ring 203 by means of bolts 226, the said bolts 226 passing through holes formed in the said ring 223. The lower ends of two rods 227 and 228 are also secured to the ring 223 by the bolts 226, the opposite upper ends of these rods 229 and 230 being bent over and engaged in holes formed in the beam 169. In addition, the rods 227 and 228 are connected to one another by a lateral strip 231.

Outlet ports are provided in the cylindrical part 178 of the housing 152 and in the cylindrical part of the control member 187, these ports being arranged in a generally similar manner to those previously described and being designated by the same reference numerals. Furthermore, the shaft 180 has an agitator connected thereto and also a helical spring 83. A support 232 similar to the support 125 previously described is provided to co-operate with the plates 161 and 162 in maintaining the implement in a stable position on the ground when it is not in use.

The implement is adapted to be coupled to the three-point lifting device of a tractor or the like by means of the aligned pins 165 and 166 which co-operate with the lower lifting links of the said device and by means of a locking pin 233 which is engaged in aligned holes in the plates 159 and 160 and co-operates with the upper lifting link of the device. The locking pin 233 is provided with an eccentric disc 234 adapted to co-operate with a lug or stop 235 secured to the frame beam 154 in the manner previously described with reference to the parts 72, 74, 75 and 76 illustrated in FIGURES 6 and 7.

In order to enable the control member 188 to be adjusted to the various coarse settings previously described in connection with FIGURES 5 and 11 to 18, the pin 194 is withdrawn from one of the eight holes 192 after which the control member can be turned manually until the new hole 192 corresponding to the desired setting comes into register with the pin 194 which is then entered in that hole. A fine adjustment of the position of the control member to vary the rate of flow of the material through the outlet ports is effected by moving the pin 196 to various settings along the slot 201. Upon moving the pin 196, the arm 197 turns about the pin 198 (FIGURE 26) which bears a fixed position with respect to the housing 152. The arm 193 which is coupled to the opposite end of the arm 197 by means of the bent-over portion 195 moves with the arm 197 to turn the control member 187. The plate 206 is employed to retain the pin 196 in any chosen setting. Since the pin 196 tends to be turned in the direction V (FIGURE 25) by the spring 209, the fixing of the plate 206 in any chosen position will prevent the pin 196 from leaving that position. When the pin 196 is lodged in the notch 201A, all the ports of the control member are fully closed. The notch is provided to allow the closed position to be maintained without moving the plate 206 in order to make it unnecessary to have to re-set the plate after every distributing operation.

The implement is adapted to be driven by the power take-off shaft of a tractor or the like by connecting the shaft 221 thereto with the aid of a telescopic coupling shaft or a further universal joint, or a combination thereof. The spreading member 184 is rotated in the direction indicated by the arrow T (FIGURES 24 and 25) and, since the ends 229 and 230 of the rods 227 and 228 are movable in the holes formed in the beam 169, the shaft 217 constituting the connection between the driving shaft and the spreading member is angularly displaceable as a whole about an axis extending substantially perpendicular to the line 181.

Figure 2:
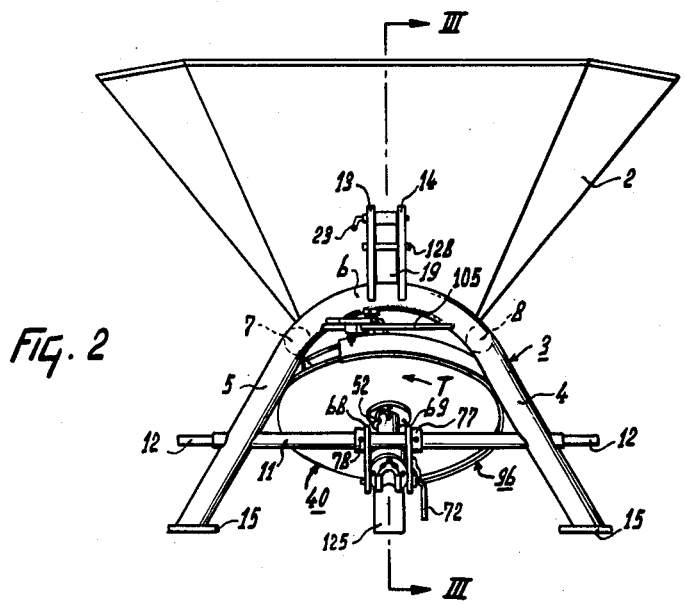

When the shaft 221 is uncoupled from the power take-off shaft of the tractor or the like and when the pin 186 is withdrawn from the hub 182, the hub can be slid axially off the end of the shaft 180 together with the spreading member 184 provided that the rods 227 and 228 have also been disconnected from the beam 169. The control member 187 can then be removed without the necessity for disconnecting any further parts. The agitator and the hopper 153 can also readily be removed in the manner previously described in connection with the embodiment shown in FIGURES 1 to 20 of the drawings. It will be clear that an implement in accordance with the invention does not require the use of any gear or other toothed wheels in its transmission and that it can be disassembled in a very simple manner. This is highly conducive to the maintenance of the implement. It will be clear that, as in the case of the first embodiment described, the universal joints 214 and 219 can be replaced by joints of other types or by flexible couplings.

What I claim is:

1. An implement for spreading material over the ground, comprising a movable frame with a container for said material, spreader means disposed below said container for spreading material, said container being provided with a bottom part substantially inclined at an angle between the horizontal and vertical, a shaft extending through said bottom part into the lower end of the container, a screw-like feeding member being associated with said shaft for feeding material through one or more outlet ports in the side wall of said container near said bottom port, said shaft extending at least substantially perpendicular to said bottom and said member being in alignment with said shaft.

2. The structure of claim 1, wherein means is provided for mounting said implement on a tractor, said shaft being provided with means for driving the same from a power take-off shaft on said tractor, including at least one universal joint.

3. An implement for spreading material over the ground, comprising a movable frame supporting a container and spreader means disposed below the container, a shaft operatively engaging said spreader means, said spreader means being rotatable with said shaft about an axis which is substantially inclined at an angle between the horizontal and vertical, said frame including a casing, at least one rod attached to said casing and extending below said spreader means, a bearing on the lower end of said rod, a bearing shaft supported by said bearing, universal joint means located on opposite sides of said bearing, one of said universal joints connecting said bearing shaft to said spreader means, means operatively connected to the other one of said universal joints comprising a power take-off.

4. The structure of claim 3, wherein said rods extend downwardly and are supported by said casing, said rods being detachably connected to said bearing.

5. The structure of claim 3 wherein said spreader means is provided with an integral hub member, a frame for said spreader means for adjustably attaching said hub member to said frame, a first cylindrical member, a second cylindrical member nested within said first cylindrical member, means for attaching said second cylindrical member to said frame, each of said cylindrical members having a plurality of apertures adapted to be brought into alignment with each other, and means for feeding material through said apertures to said spreader means.

6. The structure of claim 3 wherein said implement is provided with a frame and a member secured to said frame, said member comprising a connection between the universal joints and the frame.

7. In an implement of the kind set forth, including a container having an agitator, spreader means disposed below said container for spreading material, a shaft operatively engaging said spreader means, said spreader means being rotatable with said shaft about an axis which is substantially inclined at an angle between the horizontal and vertical, an agitator shaft rotatably connected by eccentric means on the first named shaft, said agitator shaft extending substantially vertically within said container whereby the agitator is moved in several directions within said container during operation.

8. The structure of claim 7 wherein a housing having outlets is positioned between the hopper and spreader means, said housing being provided with a first cylindrical part, a second cylindrical part nested within said first cylindrical part, said parts having apertures and means for adjusting at least one of said apertures of said first part with one of the apertures of said second part.

9. The structure of claim 7 wherein said agitator includes a plurality of rods extending substantially radially from said agitator shaft.

10. The structure of claim 9 wherein said rods are provided with inclined portions extending in a direction toward said spreader means.

11. The structure of claim 7 wherein said first named shaft is provided with a special spring for feeding material radially from said housing to said spreader means.

12. An implement for spreading material over the ground, comprising a movable frame and a container for said material, spreader means disposed below said container for spreading material, a shaft operatively engaging said spreader means, said container including a cylindrical lower part nested within a cylindrical part of a housing, said spreader means being rotatable with said shaft about an axis at an angle to the horizontal, said cylindrical part of the housing being in alignment with said shaft, said housing having a closed bottom lying between the lower part of the container and the spreader means, an annulus being provided at the upper portion of the cylindrical part of the housing integral with the said cylindrical part, said annulus extending above the spreader means and being perpendicular to the said shaft of the spreader means, said cylindrical part of the housing being provided with one or more outlet ports through which the material is supplied to the spreader means, a control member including an arm, said arm being associated with said annulus, said arm being adjustable along a frame part for adjusting and selectively controlling the position of the housing around the said shaft relative to said frame.

13. In an implement for spreading material over the ground, a container for said material, said container comprising a hopper and a housing, said hopper being vertically disposed and plural sided, said housing being substantially inclined at an angle between the horizontal and vertical and adapted to receive the lowermost edge of said hopper, a cylindrical outlet part included in the lowermost end of said housing, ports in said outlet part, a control member selectively controlling the cross-sectional area of said ports, a spiral spring and a bottom conical portion being located in said housing for urging material radially outwards to said ports.

14. An implement for spreading material over the ground, comprising a movable frame and a container for said material, spreader means disposed below said container for spreading material, a shaft operatively engaging said spreader means, said container including a cylindrical lower part nested within a cylindrical part of a housing, said spreader means being rotatable with said shaft about an axis substantially inclined at an angle between the horizontal and vertical, said second named cylindrical part being inclined in alignment with said shaft, said housing having a bottom lying between the lower part of the container and the spreader means, said cylindrical part of the housing being provided with at least one outlet port through which material is supplied to the spreader means, a control member associated with the housing for adjusting and selectively controlling the position of the housing around the said shaft relative to the said frame.

15. The structure in an implement according to claim 14, wherein said control member is spring loaded.

16. The structure in an implement according to claim 15 wherein an arm member is associated with said control member to adjust selectively said control member.

17. The structure of claim 14 wherein said spreader means are rotatable with said shaft about an axis which is inclined to the horizontal at an angle between 40–60°

References Cited in the file of this patent

UNITED STATES PATENTS

| | | |
|---|---|---|
| 204,301 | Dooley | May 28, 1878 |
| 396,251 | Adamson | Jan. 15, 1889 |
| 606,971 | James | July 5, 1898 |
| 773,616 | Willson | Nov. 1, 1904 |
| 1,011,071 | Mehlberger | Dec. 5, 1911 |
| 1,107,992 | Parrish | Aug. 18, 1914 |
| 1,166,476 | Parrish | Jan. 4, 1916 |
| 2,290,126 | Flink | July 14, 1942 |
| 2,532,518 | Scott | Dec. 5, 1950 |
| 2,561,002 | Weeks | July 17, 1951 |
| 2,672,259 | Hobgood | Mar. 16, 1954 |
| 2,800,255 | Austermiller | July 23, 1957 |
| 2,874,878 | Stokland | Feb. 24, 1959 |
| 2,901,257 | Teagle | Aug. 25, 1959 |
| 2,958,531 | Stokland | Nov. 1, 1960 |

FOREIGN PATENTS

| | | |
|---|---|---|
| 150,478 | Australia | Jan. 11, 1951 |
| 204,822 | Austria | Aug. 10, 1959 |
| 555,066 | Belgium | Mar. 15, 1957 |